US006203425B1

(12) United States Patent
Hayashi (10) Patent No.: US 6,203,425 B1
(45) Date of Patent: Mar. 20, 2001

(54) IMAGE GENERATING DEVICE, METHOD THEREOF, GAME DEVICE AND STORAGE MEDIUM

(75) Inventor: Shinobu Hayashi, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 08/930,812

(22) PCT Filed: Feb. 10, 1997

(86) PCT No.: PCT/JP97/00352

§ 371 Date: Jan. 8, 1998

§ 102(e) Date: Jan. 8, 1998

(87) PCT Pub. No.: WO97/30419

PCT Pub. Date: Aug. 21, 1997

(30) Foreign Application Priority Data

Feb. 13, 1996 (JP) .................................................. 8-025649

(51) Int. Cl.[7] .............................. A63F 13/00; A63F 9/24; G06F 17/00; G06F 19/00
(52) U.S. Cl. ................................... 463/1; 463/31; 463/32; 463/33; 463/34; 345/113; 345/114; 345/115; 345/116; 345/427; 345/473; 345/474; 345/475
(58) Field of Search .................................. 463/1, 2, 6, 7, 463/24, 30, 31, 32, 33, 34; 345/473, 474, 427, 475, 112, 113, 114, 115, 116

(56) References Cited

U.S. PATENT DOCUMENTS

| | | | |
|---|---|---|---|
| 4,424,967 | * 1/1984 | Yokoi et al. ................... | 273/1 GC X |
| 5,517,663 | * 5/1996 | Kahn ................................ | 395/800 X |
| 5,680,534 | * 10/1997 | Yamato et al. .................. | 395/173 X |
| 5,767,861 | * 6/1998 | Kimura ............................ | 345/473 X |

FOREIGN PATENT DOCUMENTS 62-191976  8/1987 (JP) .
8-255260   1/1996 (JP) .
8-315170   11/1996 (JP) .

OTHER PUBLICATIONS

Japanese Abstract Patent Application No. 8–255260.
Supplementary European Search Report.
Motion Warping, A. Witkin, et al., Computer Graphics Proceedings, Los Angeles, pp. 105–108, Aug. 1995.
Goal–Oriented Design and Correction of Articulated figure Motion with the Track System, R. Boulic, et al., Computers and Graphics, vol. 18, No. 4, pp. 443–452, Jul. 1994.

* cited by examiner

Primary Examiner—Valencia Martin-Wallace
Assistant Examiner—Binh-An D. Nguyen
(74) Attorney, Agent, or Firm—Finnegan, Henderson, Farabow, Garrett & Dunner, L.L.P.

(57) ABSTRACT

The present Invention provides image generating technology capable of expressing a complex yet natural movement of the characters with less image data regardless of the playback speed.

A image generating device of the present invention comprises a parameter generating circuit (201) which generates the playback speed parameter regarding the original image structured from a plurality of frame images, a time base interpolation circuit (202) which specifies frame images existing just before and behind the timing on the time base displayed by the playback speed parameter, and interpolates a new posture specifying information regarding frame images which should be existing in a timing on the time base utilizing posture specifying information to specify each posture of the moving objects, and a weighting interpolation circuit (203) which refers to interpolated posture specifying information regarding each of the two types of moving images displaying movement modes of differing moving objects, generates new posture specifying information by weighting interpolation between the two types of moving images, and obtains a moving image which displays a new movement mode (for example, M0A regarding "walking" and M0B regarding "running").

19 Claims, 8 Drawing Sheets

FRAME IMAGE NO.1
(PARAMETER $P_0$)
(0,0)
$O_1(x_1, y_1)$
$\theta_1$

FRAME IMAGE NO.2
(PARAMETER $P_0+\Delta p$)
$O_2(x_2, y_2)$
$\theta_2$

PRIMARY INTERPOLATION
(TIME AXIS INTERPOLATION)

PRIMARY INTERPOLATION IMAGE (PARAMETER $P_0+m\Delta p$ : m
IS INTERPOLATION RATIO ($0 \leq m \leq 1$) BETWEEN THE FRAMES)

$O_m = ((1-m)x_1+mx_2, (1-m)y_1+my_2)$

$\theta_m = (1-m)\theta_1 + m\theta_2$

FRAME IMAGE A $O_A(x_A, y_A)$

FRAME IMAGE B $O_B(x_B, y_B)$

SECONDARY INTERPOLATION
PARAMETER : n ($0 \leq n \leq 1$)

SECONDARY
INTERPOLATION IMAGE $O_n = ((1-n)x_A + nx_B, (1-n)y_A + ny_B)$ $\theta_n = n\theta_c$

FIG.8

IMAGE GENERATING DEVICE, METHOD THEREOF, GAME DEVICE AND STORAGE MEDIUM

TECHNICAL FIELD

The present invention relates to an image generating device which processes moving images of games, etc., and more particularly relates to the technology of generating images actualizing further realistic movements by generating the intermediate posture images between the varying movements (walking state, running state, etc.) of moving objects.

BACKGROUND ART

A normal video signal successively sends out every vertical synchronization period frame images in which gradual changes in the posture of the displayed objects are recorded and displays moving images wherein the object shall be viewed as moving. Here, a frame is a basic period to display one complete frame image, and for example, is equivalent to a vertical synchronization period. Further, a frame image is image data for displaying a single picture which is recorded the movement of the displayed object for each frame. Moreover, moving image data is an assembly of frame image data for displaying a series of movements of the object.

Even in the image generating devices typical of video game machines, moving character images (virtually generated moving objects or subjects) are displayed by successively sending out frame images in which gradual changes are recorded. In this video game machine, the CPU successively transmits frame images of characters, etc., to the video block. In the video block, frame images transmitted from the CPU are displayed. In other words, a video game machine reads in moving image data which are recorded the character's series of movement images ("walking" and "running") from a large capacity storage medium such as a CD-ROM, and displays moving images based on the above.

If it is a simple motion of repeating the same movement, merely storing the moving image data of such a period and repeating that several times will suffice. To display "walking," the period shall be of the time the character puts forward the left leg, puts forward the right leg, and puts forward the left leg again, and by repeating the period, the image of the character walking continuously may be displayed.

However, it is difficult to make a nonexisting, virtually created character perform complex movements. For example, when displaying a character as an athlete in a track and field event, the character starting the approach run from a walking state, gradually gaining speed, and finally spurting are the kinds of images which are required. Since the above movement changes gradually and will not use the same frame images again, moving image data which repeat the fixed movements may not be repeated several times. Therefore, it was necessary to arrange all of the frame images properly in order to display these movements. But since consuming an extensive amount of capacity of memory just to store one moving images, it is practically impossible to implement several events with one game machine.

If the two completely different movements of "walking" and "running" are switched and displayed, the walking state may suddenly shift to the running state, or the opposite movement may be performed, and the picture will be unnatural and lacking reality.

In addition, it takes much time for the manufacturer to produce original image data. Therefore, every time a new movement mode was added to the conventional video game machines, vast amounts of original data had to be inputted, and became a heavy load for the manufacturers supplying the software.

DISCLOSURE OF THE INVENTION

Thus, the first subject of the present invention is to provide an image generating device capable of displaying complex and natural movements of the character with less image data.

The second subject of the present invention is to provide a game device capable of displaying complex and natural movements of the character with less image data.

The third subject of the present invention is to provide an image generating method capable of displaying complex and natural movements of the character with less image data.

The fourth subject of the present invention is to provide a storage medium which stores the program enabling the provision of the image generating method.

An image generating device of the present invention for generating moving image data from a series of frame images for displaying moving objects, comprising:

a weighting interpolation circuit for referring to posture specifying information which specifies a posture of the moving object in each of the frame images included in each of the two types of moving image data, weighting and interpolating posture specifying information obtained from each of the two types of moving image data based on a predetermined weighting parameter in order to indicate the ratio of weighting between the two types of moving images, and generating posture specifying information for displaying a new posture.

An image generating device of the present invention, further comprising:

a time base interpolation circuit for assigning a rate parameter which indicates the rate of change in the posture of the moving object to the frame images, respectively, and if a designated playback speed parameter does not coincide with the rate parameter of either of the frame images, specifing the two frame images possessing a parameters just before and behind the timing of the playback speed parameters, and by interpolating posture specifying information in the two specified frame images, newly generating posture specifying information of frame images capable of displaying the posture equivalent to the playback speed parameter, wherein the time base interpolation circuit generates posture specifying information equivalent to the playback speed parameter regarding each of the two types of moving image data based on the designated playback speed parameter, and wherein the weighting interpolation circuit further weights and interpolates the two types of posture specifying information generated by the time base interpolation circuit, and generates posture specifying information which displays a new posture of the moving object.

An image generating device of the present invention, wherein the weighting interpolation circuit changes the weighting parameter with predetermined characteristics according to the lapse in time.

An image generating device of the present invention, wherein the weighting interpolation circuit linearly interpolates the two posture specifying information based on the weighting parameter.

An image generating device of the present invention, wherein the posture specifying information includes space position information which prescribes space positions of a plurality of parts set in advance in the moving object within the virtual space.

An image generating device of the present invention, wherein if the weighting interpolation sets each of the space positions obtained from the two types of moving image data to (xA, yA) and (xB, yB), respectively, and sets the weighting parameter to n ($0 \leq n \leq 1$), then space position (X, Y), which is the new posture specifying information, is calculated by the formula of:

$$(X, Y)=((1-n) \cdot xA + n \cdot xB, (1-n) \cdot yA + n \cdot yB).$$

An image generating device of the present invention, wherein the posture specifying information includes angle information which prescribes a rotating angle around a rotating axis in a plurality of rotating portions set in advance in the moving object.

An image generating device of the present invention, wherein if the weighting interpolation sets each of the angle information obtained from the two types of moving image data to ($\theta xA$, $\theta yA$) and ($\theta xB$, $\theta yB$), respectively, and sets the weighting parameter to n ($0 \leq n \leq 1$), then space position ($\theta x$, $\theta Y$), which is the new posture specifying information, is calculated by the formula of:

$$(\theta x, \theta Y)=((1-n) \cdot \theta xA + n \cdot \theta xB, (1-n) \cdot \theta yA + n \cdot \theta yB).$$

An image generating device of the present invention, wherein the two types of moving image data display moving images of the moving objects which resemble one another, and further, each of postures in the starting point of the change in a time series resemble each other, and each of postures in the finishing point of the change in a time series resemble each other.

An image generating device of the present invention, further comprising:
- a memory for storing posture specifying information which the weighting interpolation circuit refers to; and
- an image generating circuit for generating frame images for displaying a new posture within the virtual space based on posture specifying information interpolated by the weighting interpolation circuit.

An image generating device of the present invention, comprising:
- a memory for storing posture specifying information which the time base interpolation circuit refers to;
- an input device for inputting playback speed information by an operator;
- a parameter generating circuit for specifying the posture to be generated corresponding to the playback speed information based on the playback speed information and supplied from the input device, and suppling the playback speed parameter for displaying a specified posture to the time base interpolation circuit.

An image generating device of the present invention, wherein the playback speed information supplied by the input device is pushing information of the operation button provided in the input device, and the parameter generating circuit adjusts the size of the playback speed parameter based on the number of times the operation button is pushed per time unit based on the pushing information.

A game machine comprises an image generating device of the present invention,

The game machine utilizes the posture specifying information for specifying the movements of characters in the game.

An image generating method of the present invention for generating moving image data from a series of frame images for displaying moving objects, comprising:
- a weighting step which refers to posture specifying information which specifies a posture of the moving objects in each of the frame images included in each of the two types of moving image data, weighting and interpolates posture specifying information obtained from each of the two types of moving image data based on a predetermined weighting parameter in order to indicate the ratio of weighting between the two types of moving images, and generating posture specifying information for displaying a new posture.

A machine-readable storage medium of the present invention for storing the program to make a computer conduct the steps.

An image generating method of the present invention for generating moving image data from a series of frame images for displaying moving objects, comprising:
- a time base interpolation step for assigning a rate parameter which indicates the rate of change in the posture of the moving objects to the frame images, respectively, with regard to each of the two types of the moving image data, and if a designated playback speed parameter does not coincide with the rate parameter of either of the frame images, specifying the two frame images possessing a parameter just before and behind the timing of the playback speed parameter, and by interpolating posture specifying information in the two specified frame images, newly generating posture specifying information of frame images capable of displaying the posture equivalent to the playback speed parameter; and
- a weighting step for referring to posture specifying information generated by the time base interpolation step, weighting and interpolating posture specifying information obtained from each of the two types of moving image data based on the predetermined weighting parameter to display the ratio of weighting between the two types of moving images, and generates posture specifying information for displaying a new posture.

A machine-readable storage medium of the present invention for storing the program to make a computer conduct the steps.

In the present invention, "moving objects" are character models of athletes and the like.

"Moving image data" is a kind of which is structured of frame image data which are stored the moving objects in a time series. For example, data which display a series of movements of putting forth the light leg, putting forth the left leg, and putting forth the right leg again.

"Two types of moving image data" are, for example, sets of image data displaying "walking" and "running", "an enthusiastic walk" and "a tired walk," etc.

"Posture specifying information" is, for example, information of a space position or an angle of a joint in the virtual space.

"New posture" is, for example, an intermediate posture such as an "approach run" between "walking" and "running."

"Parameter," for example, sets the first posture of the moving image data to 0, and the last posture to 1, and shows the posture in ratio between such data.

"Prescribed characteristics" are, for example, characteristics in which the parameter changes linearly or curvilinearly against the lapse in time.

"Plurality of parts set in advance in the moving objects" is, for example, each part of the human body such as the arm, leg, body and head.

"Rotating parts" are, for example, joints of the human body and the like rotate to clockwise or counter-clockwise direction.

"Moving images of moving objects which resemble one another" are, for example, fellow moving images which possess the relation of having the same steps in moving the arms and legs as in "walking" or "running," etc., but differing in the degree of movement.

"Fellow postures in the starting point of the change in a time series and fellow postures in the finishing point of the change in a time series" is the posture of the image equivalent to, for example, if it is "walking" and "running," the first posture being the state wherein the left leg and right arm are raised to the highest point, and the final posture being the posture of the frame preceding the first frame.

"Storage medium" is RAM (regardless of it being volatile or nonvolatile, etc.), ROM (including EPROM, EEPROM, etc.), photo-magnetic disks (various photo-magnetic storage mediums such as a CD, CD-ROM, CD-R and WOROM), device memory such as an IC card, flexible disk, magnetic storage mediums such as a magnetic disk (hard disk), and further shall include situations when receiving transferred data from the host computer via telecommunication circuits (public circuit, data exclusive circuit, satellite circuit, etc.).

BEST MODE FOR CARRYING OUT THE INVENTION

Below, the ideal mode for carrying out the present invention is explained by referring to the diagrams.

(I) Structure

Figure 1:
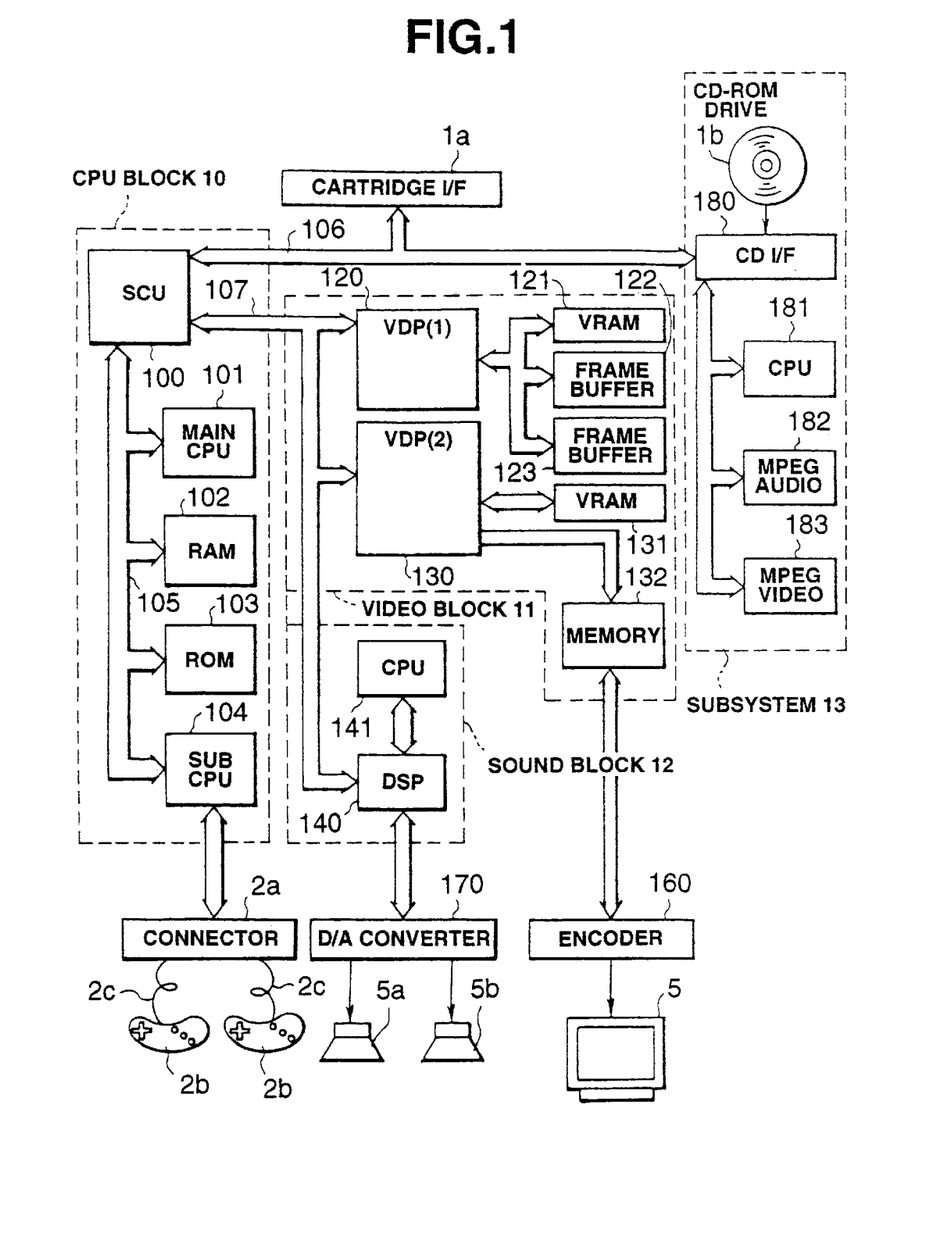
FIG. 1. A structural diagram of the game machine comprising an image generating device according to the embodiment of the present invention.

In FIG. 1, a block diagram of the video game machine which utilizes the image generating device according to the embodiment of the present invention is shown. The present image generating device is structured of CPU block 10, which implements the controlling of the entire device, video block 11, which implements the display control of the game screen, sound block 12, which generates sound effects, etc., and subsystem 13, which implements the read out of the CD-ROM.

(Structure of the CPU Block)

CPU block 10 operates as the weighting and interpolating means, time base interpolating means and parameter generating means of the present invention. CPU block 10 is structured of SCU (System Control Unit) 100, main CPU 101, RAM 102, ROM 103, cartridge interface (I/F) 1a, sub CPU 104, CPU bus 105, etc.

Main CPU 101 comprises a DSP in the inside, and is capable of executing the computer program at high speeds. RAM 102 operates as the memory of the present invention, and besides storing posture specifying information of athletes to be displayed on the monitor device, is used as the work area of main CPU 101. ROM 13 stores the initial program for the initialization processing to be implemented in the early stages of the device. SCU 100 generalizes the transfer of data implemented via bus 105, 106 and 107. Further, SCU 100 comprises a DMA controller in the inside, and transfers the required image data during the execution of the game to the VRAM within video block 11. Cartridge I/F 1a becomes the window to read in the application software (computer programs for games) supplied in the mode of a ROM cartridge.

Pad 2b functions as an input means of the present invention, and comprises a cross-shaped cursor key as the operation button for displaying direction, a speed button which corresponds to playback speed information, a jump button which corresponds to the jump movement, etc. Sub CPU 104 is referred to as the SMPC (System Manager & Peripheral Control), and comprises a function of gathering data (peripheral data) via connector 2a from pad 2b according to the request from main CPU 101. Main CPU 101 implements the processing to move images and the like to be displayed on the display based on the peripheral data transferred from sub CPU 104. A desired peripheral machinery like a pad, joystick, keyboard, etc., may be connected to connector 2a. Sub CPU 104 judges the type of peripheral machinery connected to connector 2a (main body side terminal) and gathers the peripheral data complying to the telecommunication method according to the type of the judged peripheral machinery.

(Structure of the Video Block)

Video block 11 operates as an image generating means of the present invention. Video block 11 comprises VDP (Video Display Processor) 120 for generating mainly images of moving objects such as people and automobiles (hereinafter referred to as "characters") of the images of this video game, and VDP 130 which implements the synthesizing and clipping of images for background pictures. VDP 120 is connected to RAM 121 and frame buffer 122 and 123.

When displaying characters as a gathering of a plurality of triangular or square figures, each figure is called a polygon, and the gathering of the vertex coordinates of each figure is called polygon data. The athlete which is a moving object, is structured of a gathering of parts such as arms, thighs, shins, torso and head. Since it is necessary to move these parts together, the parts are structured of a gathering of polygons (hereinafter referred to as "polygon groups"), and are moved as one unit for every polygon group. Posture specifying information specifies the relation of the relative position for every polygon group. In the present embodiment, posture specifying information is considered as a space position information which specifies the space position within the virtual space of each part of the athlete's body, and angle information which prescribes the bending of each of the joints in the athlete's body.

When generating the virtual image (hereinafter referred to as the "game image") for games, necessary polygon data for display are transferred to VDP 120 via SCU 100 from CPU 101, and is written into VRAM 121. The interpolation data to be stored in RAM 102 is posture specifying information generated by the interpolation processing of the present invention. CPU 101 refers to this interpolation data and calculates posture specifying information of the polygon group to be displayed subsequently, and together with the polygon data, transfers coordinate conversion matrixes which display each of the polygons with this posture to VRAM 121. Polygon data written into VRAM 121 is stored as drawing data including 6 bit or 8 bit color information per one pixel into frame buffer 122 or 123 used for drawing. The stored drawing data is transferred to VDP 130. Main CPU 101 supplies controlling information which controls the drawings to VDP 130 via SCU 100. VDP 120 processes the drawing data according to this controlling information.

VDP 130 is connected to VRAM 131. VDP 130 comprises a function which rotates or moves the entire screen up, down, left and right, and a priority function which decides the displaying order of the large number of displaying screens. VDP 130 outputs image data to encoder 160 via memory 132. After converting the format to a video signal by adding the synchronization signal to this image data, encoder 160 outputs the video signal which implemented the D/A conversion. Monitor device 5 displays images based on the video signal.

(Structure of Other Blocks)

Sound block 12 is structured of DSP 140, which implements voice synthesizing by the PCM method or FM method, and CPU 141, which controls, etc., DSP 140. The voice data generated by DSP 140 is outputted to speaker 5a and 5b after it is converted to a two channel signal by D/A converter 170.

Subsystem 13 is structured of CD-ROM drive 1b, CDI/F 180, CPU 181, MPEG voice processor 182, MPEG image processor 183, etc. Subsystem 13 comprises the functions such as reading in the application software supplied by the storage medium of a CD-ROM, etc., and implementing the playback of images. CD-ROM drive 1b reads in data from a CD-ROM. CPU 181 implements the controlling of CD-ROM drive 1b and the error correcting processing of the read in data. Data read in from the CD-ROM is supplied to main CPU 101 via CDI/F 180, bus 106 and SCU 100. MPEG voice processor 182 and MPEG image processor 183 decodes the compressed data according to the prescriptions of MPEG (Motion Picture Expert Group), which is one of the international standards relating to the high efficiency symbol compression of moving images. By decoding the moving images utilizing MPEG voice processor 182 and MPEG image processor 183, it is possible to implement the playback of moving images.

(Structure of the Function Block)

Figure 2:
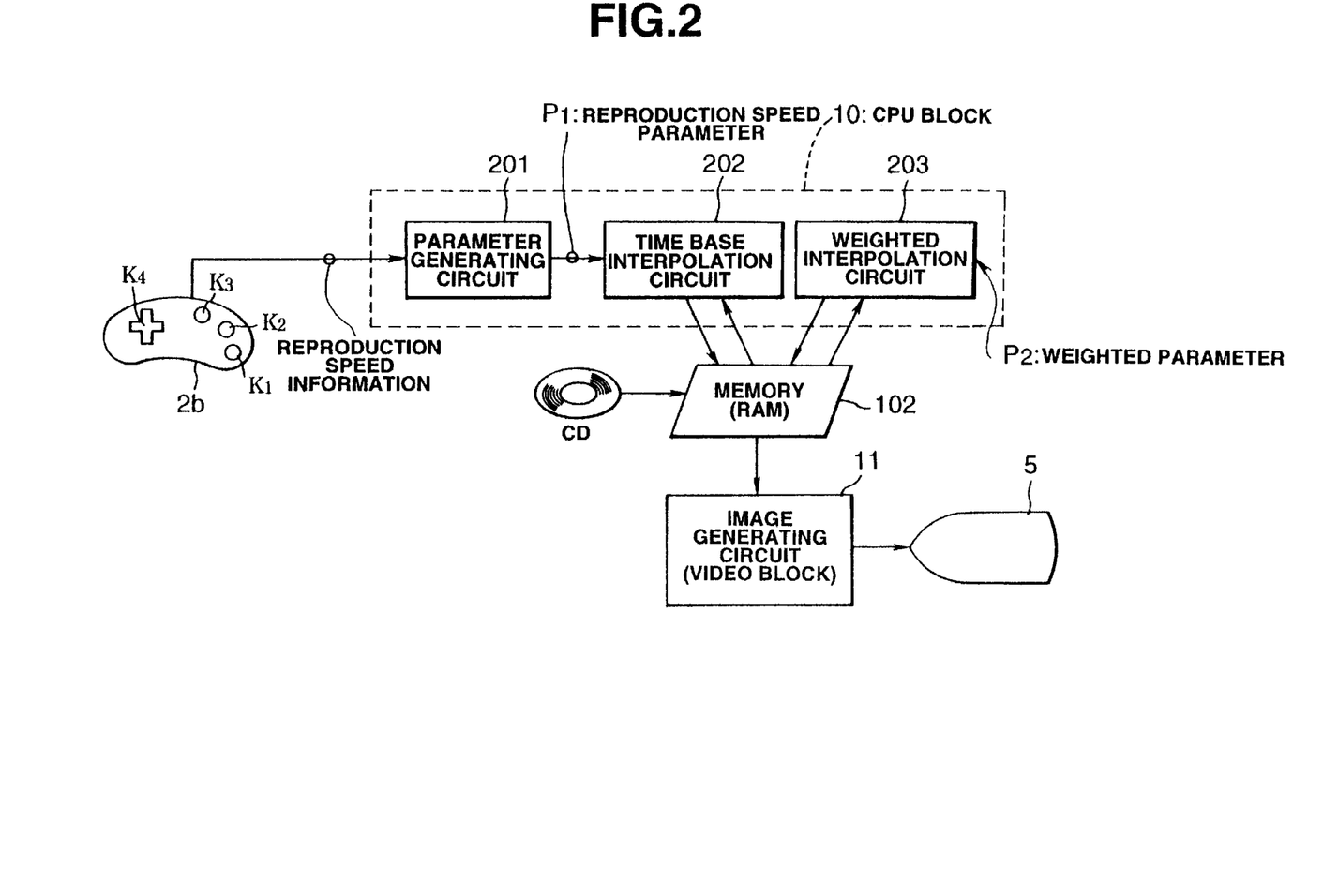
FIG. 2. A functional block diagram of an image generating device according to the embodiment of the present invention.

In FIG. 2, the structure of the function block when specifying the present invention by function is shown.

Pad 2b functions as an input device of the present invention. CPU block 101 functions as parameter generating circuit 201, time base interpolation circuit 202 and weighting interpolation circuit 203. RAM 102 functions as a memory, and video block 11 functions as an image generating circuit. Parallel to the read in of the program data, posture specifying information (hereinafter referred to as "motion data") of the polygon group for every frame regarding the two types of differing movement modes (for example, "walking" and "running" of the athlete) are transferred to memory 102 from the CD-ROM. Each motion data is shown as M0A regarding "walking" and M0B regarding "running."

Operation button k1 is the speed button in pad 2b. A pulse is outputted every time the speed button is pushed. This pulse is supplied to parameter generating circuit 201 as playback speed information. Operation button k2 is the jump button. For example, if the theme of the game program is running broad jump of the track and field events, this jump button k2 is pushed at the timing of making the athlete jump. Operation button k3 is the menu button. The reset button is pushed when discontinuing the game and displaying the menu screen, etc. Cross-shaped cursor key k4 is a direction displaying button. This is used when selecting the menu or displaying the running direction of the athlete.

Parameter generating circuit 201 counts the number of pulses per time unit included in the playback speed information supplied from pad 2b, and calculates playback speed parameter (primary interpolation parameter) P1 based on the number of frame images structuring the entire motion data stored in memory 102.

Time base interpolation circuit 202 refers to posture specifying information of motion data M0 stored in memory 102, and specifies frame images existing just before and behind the timing on the time base indicated by playback speed parameter P1 supplied from parameter generating circuit 201. And further it generates posture specifying information to specify a frame image equivalent to the timing on the time base by time base interpolation (primary interpolation) processing, and stores it into memory 102 again.

Posture specifying information which implemented the time base interpolation is called primary interpolation data M1. Time base interpolation circuit 202 generates two primary interpolation data, M1A and M1B, regarding each of the two types of differing motion data. Primary interpolation is generated by linearly interpolating posture specifying information of the frame just before and behind the timing of the motion data.

Memory 102 stores posture specifying information. This memory is capable of being written in and read out data from both time base interpolation means 202 and weighting interpolation 203. Further, there may be situations where a part of an image data is transferred to memory 102 from the CD-ROM which stores the main body of the game program and various image data.

Image generating circuit 11 generates frame images which structure moving images of the new posture based on secondary interpolation data M2, and supplies them to monitor device 5.

(II) Operations

Figure 3:
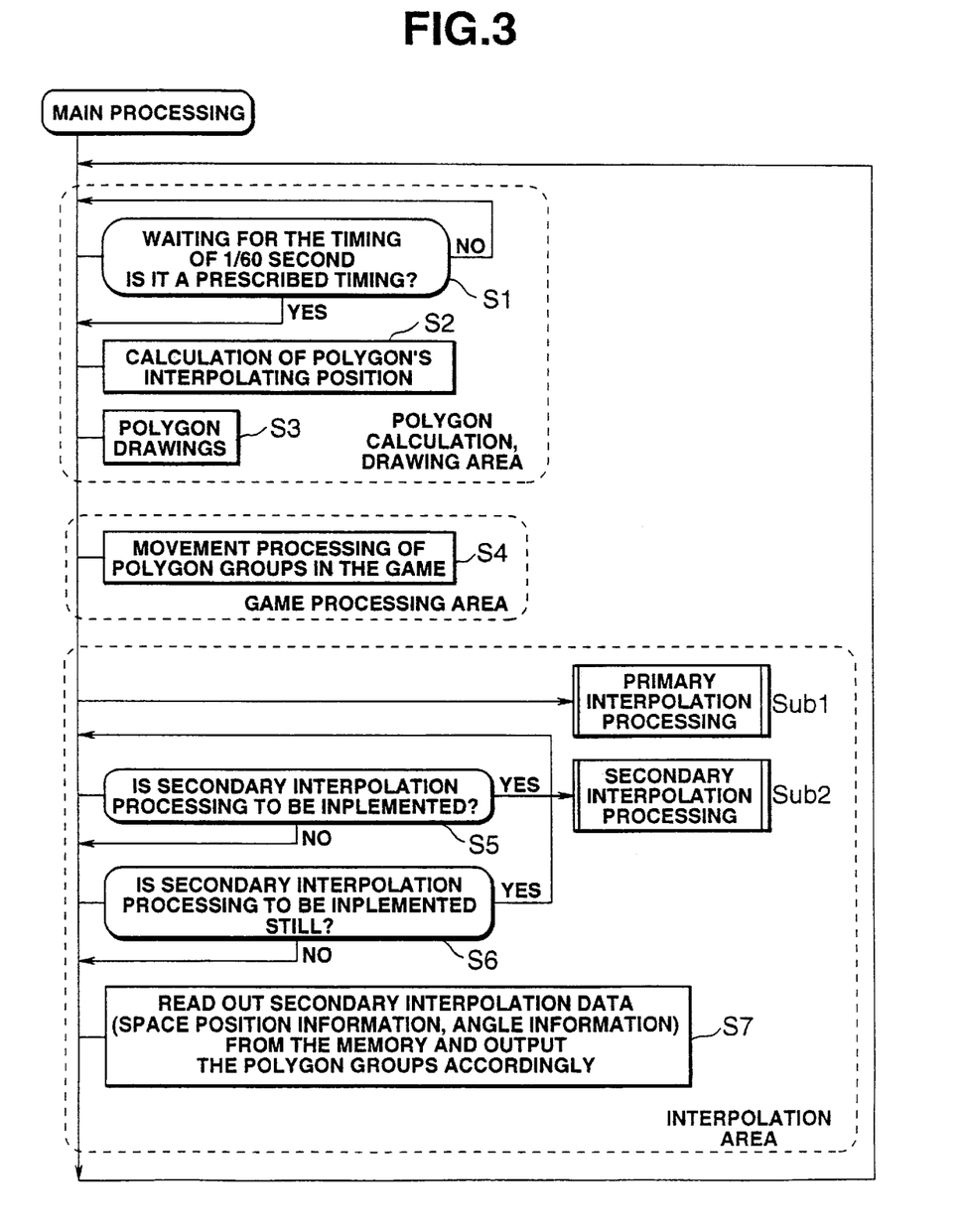
FIG. 3. A flowchart explaining the main processing of the present embodiment.

In FIG. 3, a flowchart for image generation of the present invention is shown as an embodiment of the present invention.

Let it be considered that the game program to be executed in the present embodiment is of a theme of track and field events. A user will select the desired event within a plurality of events provided by the game program. In order to select the event, the user will push menu button k3 of pad 2b. On the menu screen, a menu bar is shown for selecting the provided events for game playing, for example, "javelin throw," "110-meter hurdles," "100-meter run" and "running long jump." The user pushes cursor key 4, moves the cursor to the menu bar displaying the event to be played, and selects such event. The following is an explanation considering that "running broad jump" was selected in this present embodiment.

Step S1 works as a timer to wait for the display timing (here, it is 1/60 sec.) of a frame image. When CPU 101 detects that it has become the display timing (step S1; YES), video block 11 calculates the display position of the polygons structuring the athletes and the like to be displayed on the monitor device (step S2). Image information to be displayed in the display timing of the subsequent frame image is supplied to VRAM 121 from CPU 101 in advance. VDP 120 generates a view image of the virtual space viewed from the prescribed viewpoint, utilizing information stored in VRAM 121. When the coordinate conversion is implemented, texture data is covered and VDP 130 implements the drawing of the polygons (step S3).

CPU 101 implements the game processing in step S4. In other words, it determines the movement mode according to the position of the athlete within the virtual space or the contents of the display from pad 2b. In the event of "running long jump," at first, the athlete is still at the start line. Here, when the user begins to push speed button k1 of pad 2b, the pulse is transferred to CPU 101 via sub CPU 104, connector 2a from pad 2b every time speed button k1 is pushed. CPU 101 takes in this pulse as playback speed information, and generates playback speed parameter P1 based on the number of times pushed per time unit. When speed button k1 is pushed frequently, not only does the period of the athlete's "walking" become shorter, but gradually transfers from the movement of "walking" to "running." Then becomes top speed just before the takeoff board. When the athlete arrives at the position of the takeoff board and the user pushes jump button k3, the athlete jumps based on the motion data relating to "jump."

Basic data of generating the new moving image of the athlete is the above moving data. Motion data is structured by posture specifying information regarding frame images which enable the playback of the same movement. For example, in order to repeat the movement of "walking", frame images show a scene of the athlete's right leg rising in the highest position through the right leg rising until the left leg is raised to the highest position again are only needed. So the motion data comprises posture specifying information derived from frame images (tens of frames). According to the above, when the athlete's movement is only "walking," only "running," or "jump," it is only necessary to display repeatedly the image of the athlete utilizing the motion data provided by the CD-ROM for each of the movements. However, by merely displaying the motion data as is, the moving speed of the athlete cannot be changed. Interpolation to change the moving speed of the same movement (for example, only "walking") is the time base interpolation (primary interpolation). This is implemented in subroutine Sub 1.

Further, in an event such as "running long jump," since the athlete's movement gradually changes from "walking" to "running," an intermediate movement mode which is different from "walking" and "running" is required. Since "walking" and "running" are displayed by one motion data, an intermediate movement mode cannot be obtained by only displaying either of the selected data. In addition, though each intermediate movement mode may be stored as motion data, it is wasteful to prepare motion data for each of the intermediate movement modes considering that there are possibilities of infinite combinations for every event. The interpolation processing to resolve this problem is the weighting interpolation (secondary interpolation) of the present invention. The weighting interpolation is interpolation processing which enables to generate the intermediate movement mode solely from the motion data of the basic movement modes. This is implemented in subroutine Sub 2.

Since primary interpolation which adjusts the moving speed is constantly a necessary step, it is always periodically implemented during main processing (Sub 1). On the other hand, secondary interpolation which displays the intermediate movement mode only needs to be implemented in specified conditions when such intermediate movement is required (for example, the intermediate movement between "walking" and "running" is only required in the approach run section of the "running long jump," and is not required in the section of "jump"). From this point of view, whether there is a necessity of secondary interpolation processing is judged (step S5, step S6), and secondary interpolation processing (Sub 2) is implemented only when necessary (YES).

In step S7, CPU 101 reads out the completed interpolation data from memory (RAM) 102, and transfers the corresponding polygon group data to video block 11.

(Principle of Primary Interpolation Processing)

Figure 4:
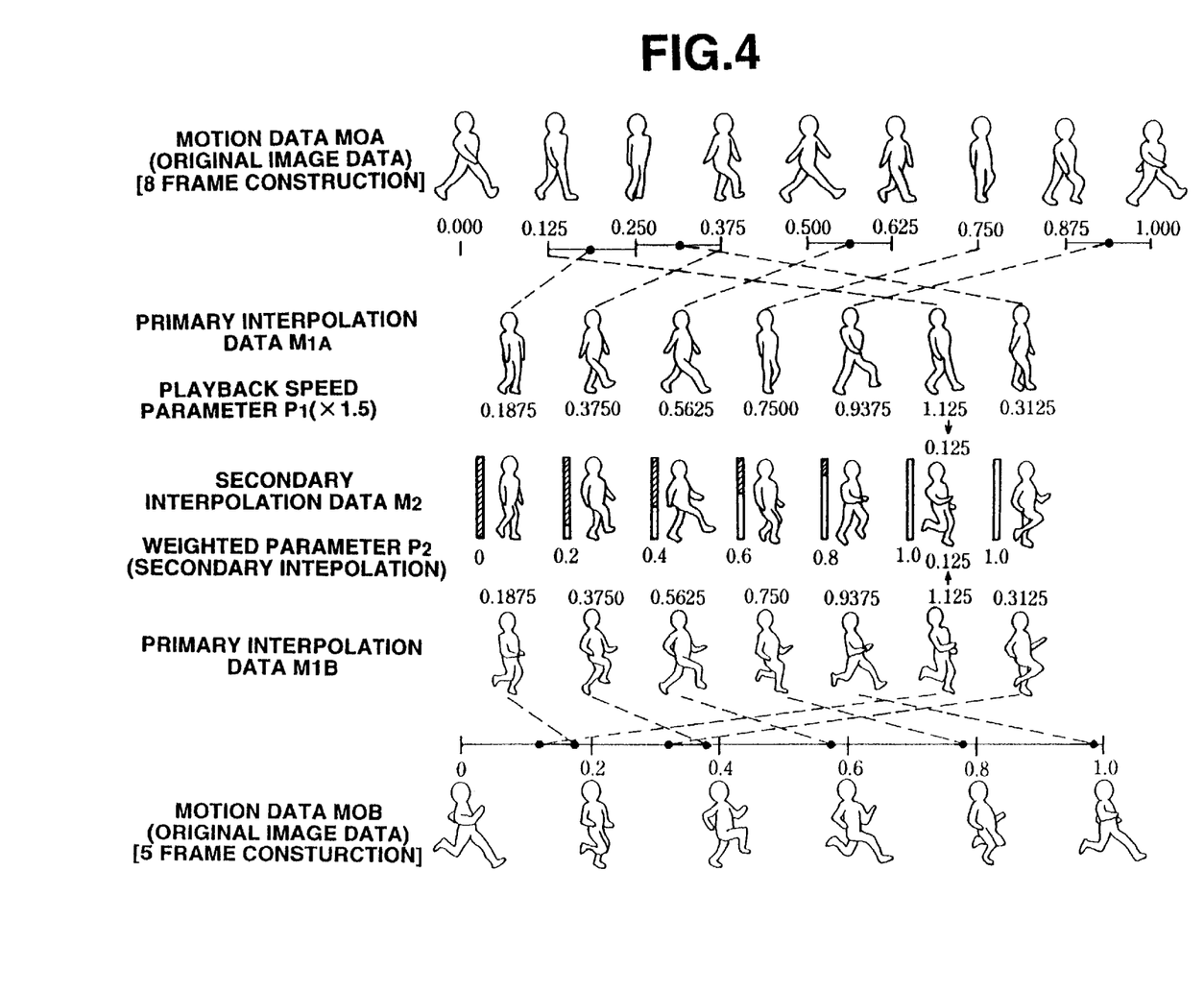
FIG. 4. An explanatory diagram showing the relation between primary interpolation and secondary interpolation according to the present embodiment.

In FIG. 4, the explanatory diagram of the changes in the images during the implementation of primary interpolation processing to secondary interpolation processing on the basis of the motion data is shown. In the same diagram, letter "A" implies "walking" and letter "B" implies "running."

Foremost, how to set forth the playback speed parameter is explained. Each motion data M0A or M0B is structured of a sufficient number of frame images for displaying each of the moving images. For example, since the movement of "walking" is implemented slowly, the number of frame images of motion data M0A become greater (for example, approximately 70 frames). On the other hand, since there are not necessary for the movement of "running" to be displayed slowly, frame images of motion data M0B are less (approximately 50 frames). In the same diagram, for simplification, it is shown as M0A being structured of 8 frames and M0B being structured of 5 frames.

Further, in order to implement secondary interpolation, it is favorable of the two differing movement modes performing similar movements. For example, in "walking" and "running," since the movement is an alternation of putting out the right hand and left hand, and the right foot and left foot, this may be considered as the "similar" movement stated herein. This similar movement requires the basic posture to be similar. In other words, in both motion data M0A and M0B, image data is prepared as the first frame image being a movement of the athlete raising the left leg to the highest position, the mid intermediate frame image being the movement of raising the right leg to the highest position, and the final frame image being a movement equivalent to a frame preceding the first frame image. Therefore, if each motion data is displayed as is, in either movement, the athlete implements the movement from raising the left leg until raising the left leg again, but the displayed period will be different. The meaning of the displayed period being different is that it is impossible to implement secondary interpolation utilizing the frame images of each of the motion data as is.

Accordingly, the present invention utilizes the conception of a parameter. If it is the same parameter, same movements may be pointed to either motion data. A parameter displays the ratio equivalent to the timing on the time base of each frame in which the first basic posture (frame no. 1) is the starting point. In FIG. 4, the first frame is set to 0 and the last frame to 1 for both motion data, and the section of 0 through 1 is to be equally divided according to the number of frames of each motion data. In motion data M0A, a parameter changing amount of 0.125 ($=\frac{1}{8}$) per frame is assigned since there are 8 frames. In motion data M0B, a parameter changing amount of 0.2 (=⅕) per frame is assigned since there are 5 frames. Further, the parameter changing amount of $\Delta p$ is guided by:

$\Delta p$=1/number of frames structuring the motion data.

Whenever primary interpolation processing according to subroutine Sub 1 is called, the frame image to be displayed next is designated by the value of the playback speed parameter. When the playback speed is to be increased, the changing amount of the playback speed parameter which is increased with each frame shall be increased. Further, when the playback speed is to be decreased, the changing amount of the playback speed parameter shall be decreased. Moreover, if the changing amount of the playback speed parameter is made negative, it becomes a playback in reverse direction.

If the playback speed differs with the original motion data, posture specifying information and frame images not stored in memory 102 is required. The processing of generating these frame images which are not stored, by interpolating between frame images just before and behind is primary interpolation processing (time base interpolation). Here, the playback speed of the "walking" movement shall be considered as being increased by 1.5 times. In other words, if the parameter assigned to each frame of motion data M0A is increased by 1.5 times, the playback speed parameter P1 may be obtained. In the same diagram, if parameter 0.125 equivalent to frame no. 2 is increased by 1.5 times, it becomes 0.1875, and if 0.075 equivalent to frame no. 4 is increased by 1.5 times, it becomes 0.5625, but frame images corresponding to these playback speed parameters do not exist. When frame images corresponding to the timing on the time base designated by the playback speed parameter do not exist, posture specifying information of the frame images existing just before and behind the timing on the time base is referred to, and generates posture specifying information of frame images in the timing on the time base designated by the playback speed parameter. For example, in order to generate posture specifying information of frame images corresponding to playback speed parameter 0.1875, frame image no. 2 (parameter 0.125) and frame image no. 3 (parameter 0.250) are referred to.

Figure 5:
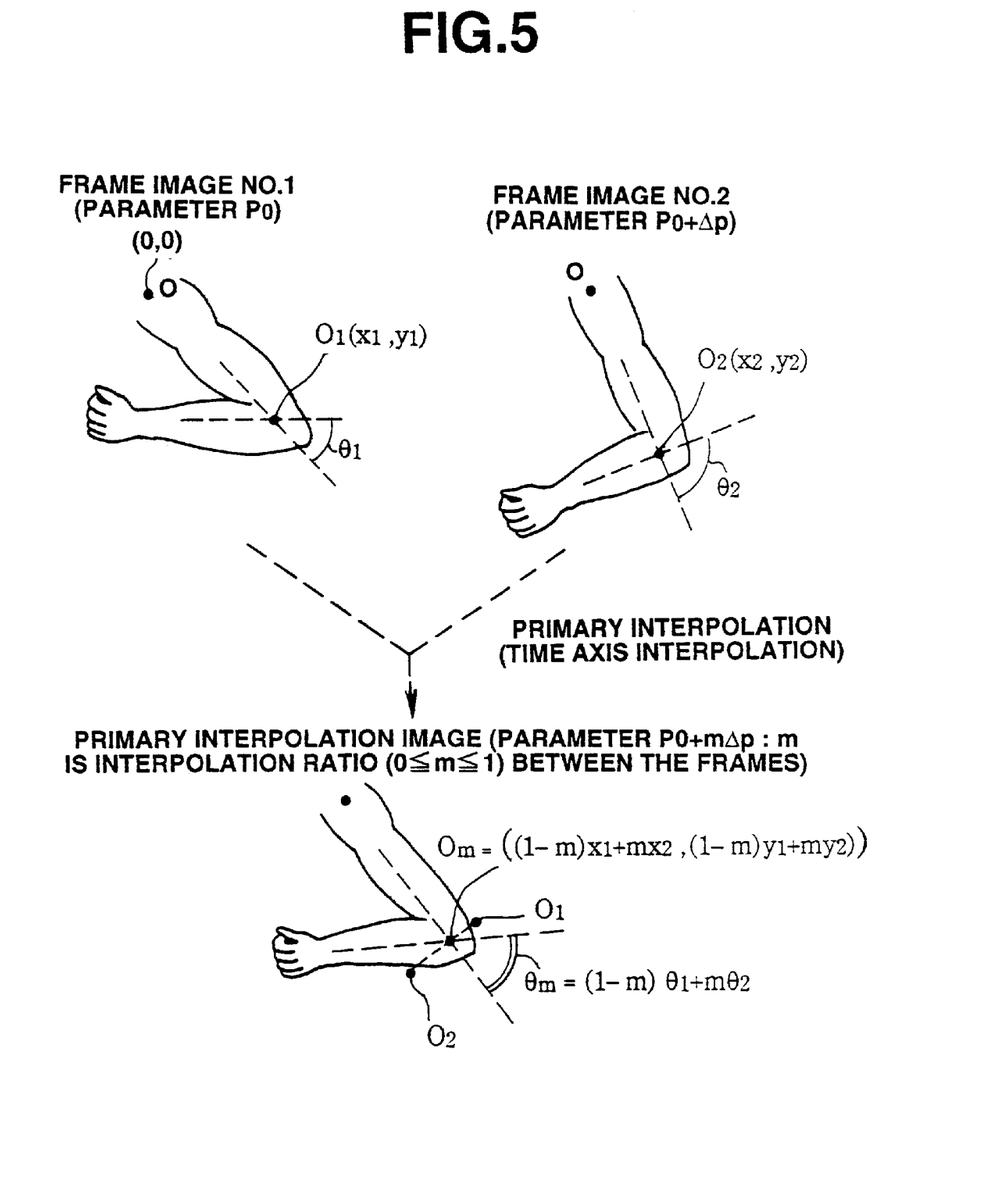
FIG. 5. An explanatory diagram of the computing method of primary interpolation according to the present embodiment.

FIG. 5 is a diagram taking an example of a part of the athlete's arm and explaining the primary interpolation of posture specifying information in a joint of an elbow. In order for it to be easily understood, both the space position and coordinates are considered in two dimensional aspects. Parameter P0 is assigned to frame image 1, the coordinates of the space position of joint O2 are (x2, y2), and the angle of the joint is θ2. $\Delta p$ is the parameter changing amount for each frame image set forth from the number of frames structuring the motion data.

To obtain frame images in the timing on the time base divided by the ratio of, for example, m:1-m (0≦n≦1), in between both frame images, the coordinates and angle θm of space position Om of the primary interpolation data which has been primary interpolated is obtained by the formula below if it is to be interpolated linearly.

Space position $Om=((1-m) \cdot x1_1+m \cdot x2, (1-m) \cdot y1+m \cdot y2)$

Angle $\theta m=(1-m) \cdot \theta 1+m \cdot \theta 2$

That is, if the timing on the time base indicated by playback speed parameter P1 is obtained, frame images just before and behind such position and the ratio "m" which divides the sections between the images will be known, therefore, the primary interpolated posture specifying information may be calculated based on the above.

Figure 6:
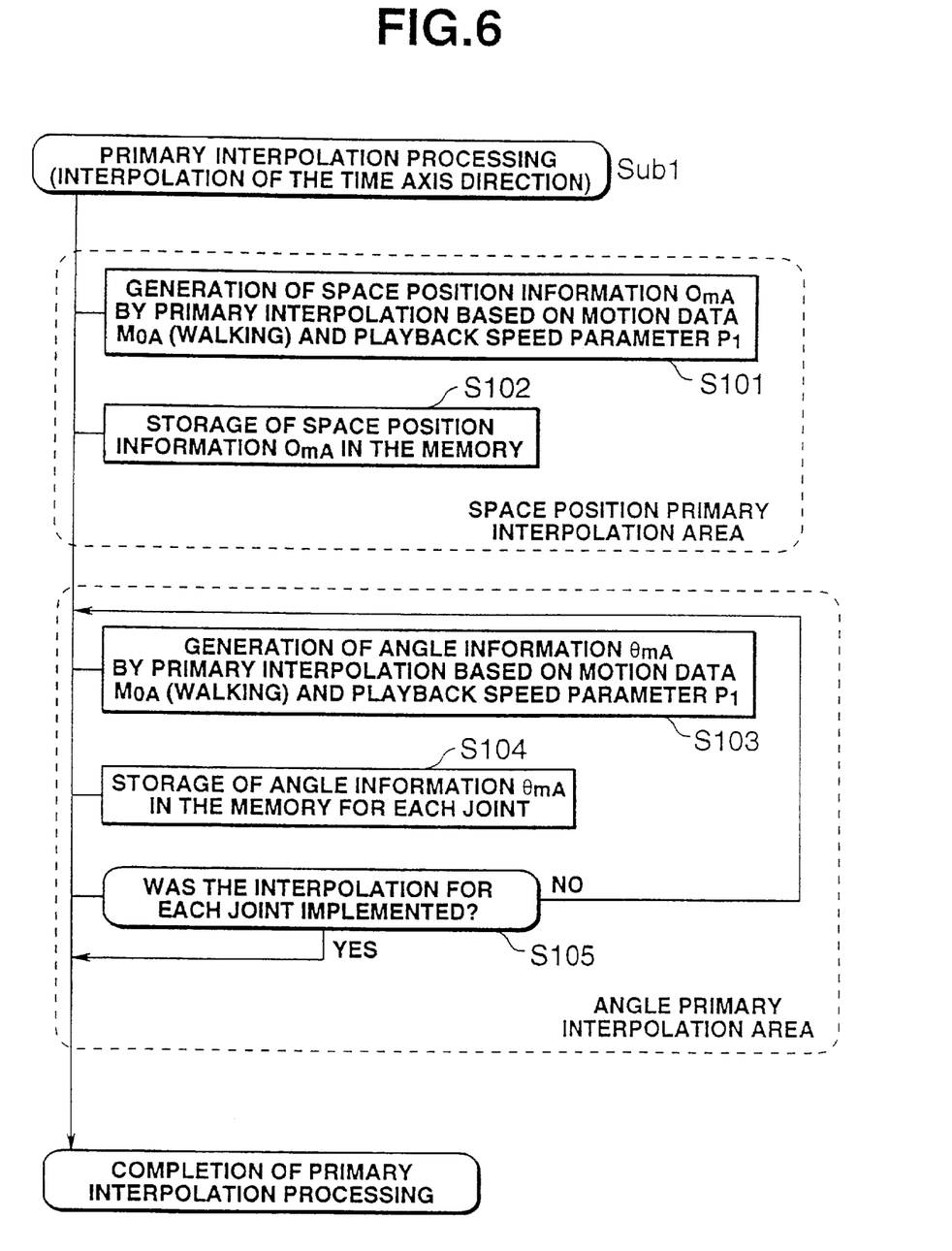
FIG. 6. A flowchart explaining the primary interpolation processing according to the present embodiment.

In FIG. 6, a flowchart explaining the primary interpolation (time base interpolation) processing is shown. Primary interpolation processing is implemented by the function block (time base interpolation circuit 202), wherein CPU 101 is the principle aspect. Since the secondary interpolation processing is also implemented in the present embodiment, it is favorable to implement the primary interpolation processing in advance regarding each of the two motion data required for secondary interpolation. FIG. 6 only shows the interpolation processing of one of these motion data ("walking" movement).

Foremost, parameter generating circuit 201 decides playback speed parameter P1. In other words, parameter changing amount $\Delta p$ the magnification of the playback speed is added to the value of playback interpolation parameter P1 calculated in the previous frame. When the value of playback speed parameter P1 exceeds 1, since it implies that the playback of the first period has been completed and has entered into the succeeding period, the units digit shall be returned to 0 (subtract 1), and numbers below the decimal point shall be considered as valid numbers. For example, when calculating the playback speed parameter of frame no. 6 of FIG. 4, when parameter changing amount $\Delta p$ (0.125) magnification (1.5) of the playback speed is added to the previous playback speed parameter P1 (0.9375), it becomes 1.125. Since the playback parameter exceeds 1, this playback speed parameter is set to 0.125.

In step S101, ratio "m" of the primary interpolation is calculated based on the decided playback speed parameter P1, and the primary interpolation processing is implemented. The acquired space position information OmA is stored in memory (step S102). Similarly, in step S103, primary interpolation of the angle of the joint is implemented based on playback speed parameter P1. The acquired angle information θmA is temporarily stored in memory (step S104). If there are joints which have not implemented the interpolation (step S105; NO), steps S103 through S104 are repeated, and implements primary interpolation for all joints (step S105; YES).

(Principle of Secondary Interpolation Processing)

Figure 7:
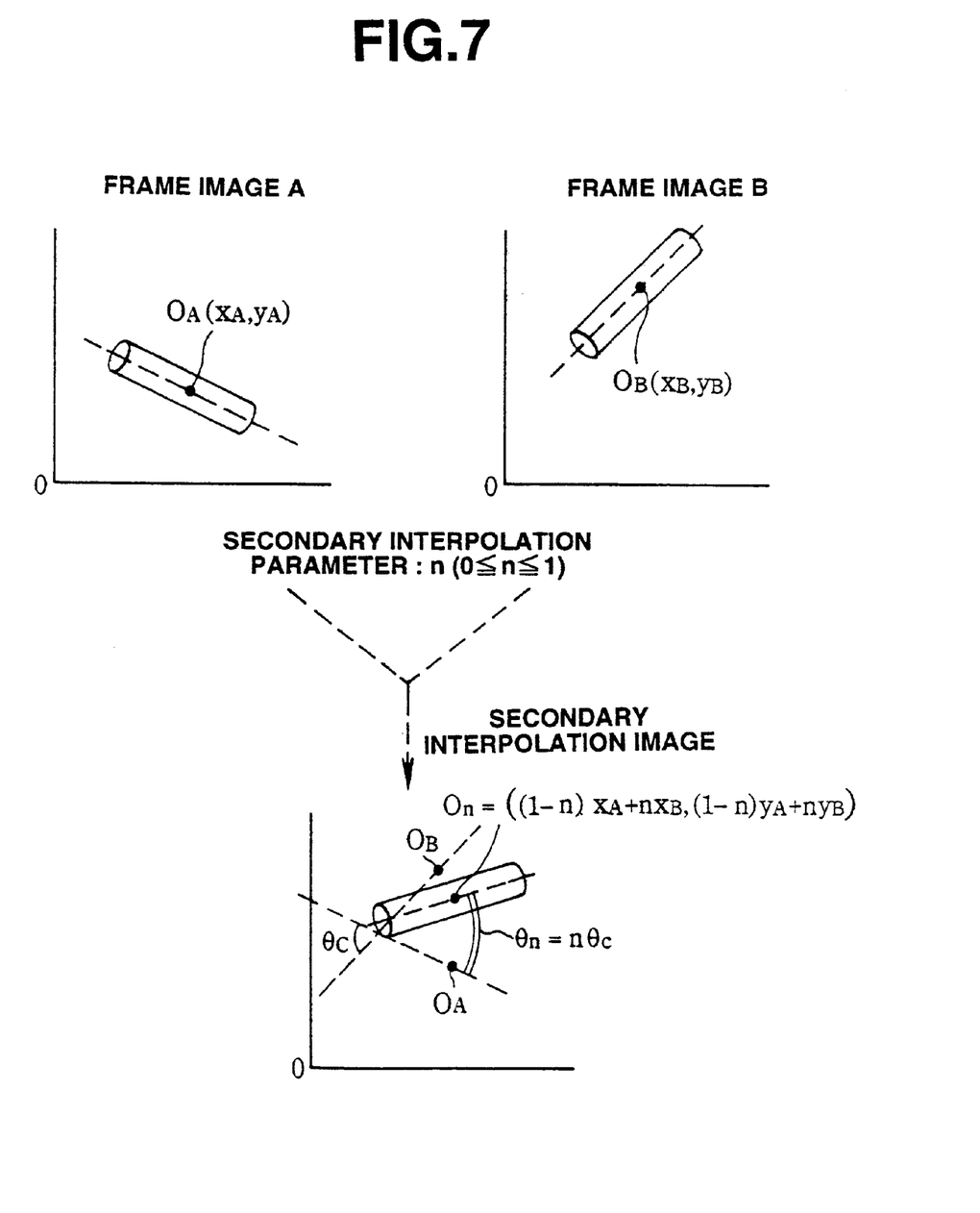
FIG. 7. An explanatory diagram of the computing method of secondary interpolation according to the present embodiment.

In FIG. 7, the explanatory diagram of the secondary interpolation (weighting interpolation) processing is shown. Secondary interpolation could not be implemented until the primary interpolation obtains the differing frame images displaying the movement mode of the same object equivalent to the same position on the time base, respectively.

Frame image "A" and frame image "B" show frame images displayed by the primary interpolated posture specifying information. Frame image "A," for example, is an image of primary interpolated motion data M0A, and the coordinates of central axis OA of the polygon data are (xA, yA). Frame image "B" is an image equivalent to the same position on the time base as frame image "A," and for example, is an image of primary interpolated M0B, and the coordinates of the central position of the polygon data are (xB, yB). Secondary interpolation is processed in the same manner as primary interpolation. In primary interpolation, the interpolation ratio from the playback speed parameter was unconditionally set forth, whereas, in secondary interpolation, an independently predetermined weighting parameter "n" is utilized for the interpolation ratio (weighting). If frame image "A" and frame image "B" are to be interpolated linearly with weighting parameter "n". Space position On of the interpolation image becomes:

Space position $On=((1-n) \cdot xA+n \cdot xB, (1-n) \cdot yA+n \cdot yB)$.

Further, if the angle of the parts rotating between frame "A" and frame "B" is θC, angle θn of the interpolation image becomes:

Angle θn=n·θC.

"n" shall be changed by the program. For example, the value of parameter "n" may be changed linearly as in a monotonous increase (or decrease) for each frame, or may be changed curvilinearly according to desired characteristics. That is, weighting parameter "n" may be changed with the characteristics of which can display a further natural changing movement on the displayed image.

Secondary interpolation is explained in FIG. 4. Weighting parameter P2 (equivalent to above "n") is a factor to determine weighting and interpolating to primary interpolation data M1B of motion data M0B against primary interpolation data M1A of motion data M0B. If P2=0, primary interpolation data M1B will not at all be weighting, and secondary interpolation data M2 becomes the actual interpolation data M1B of motion data M0B. In the diagram, since weighting parameter P2 of frame no. 1 is 0, only primary interpolation data M1A is displayed, but in frame nos. 2 through 6, weighting parameter P2 linearly increases by 0.2. That is, the first frame image which displays athlete's walking image gradually begins to display the approach run, and from frame no. 6 onwards, interpolation images which naturally transfer to the top speed of "running" are generated.

Figure 8:
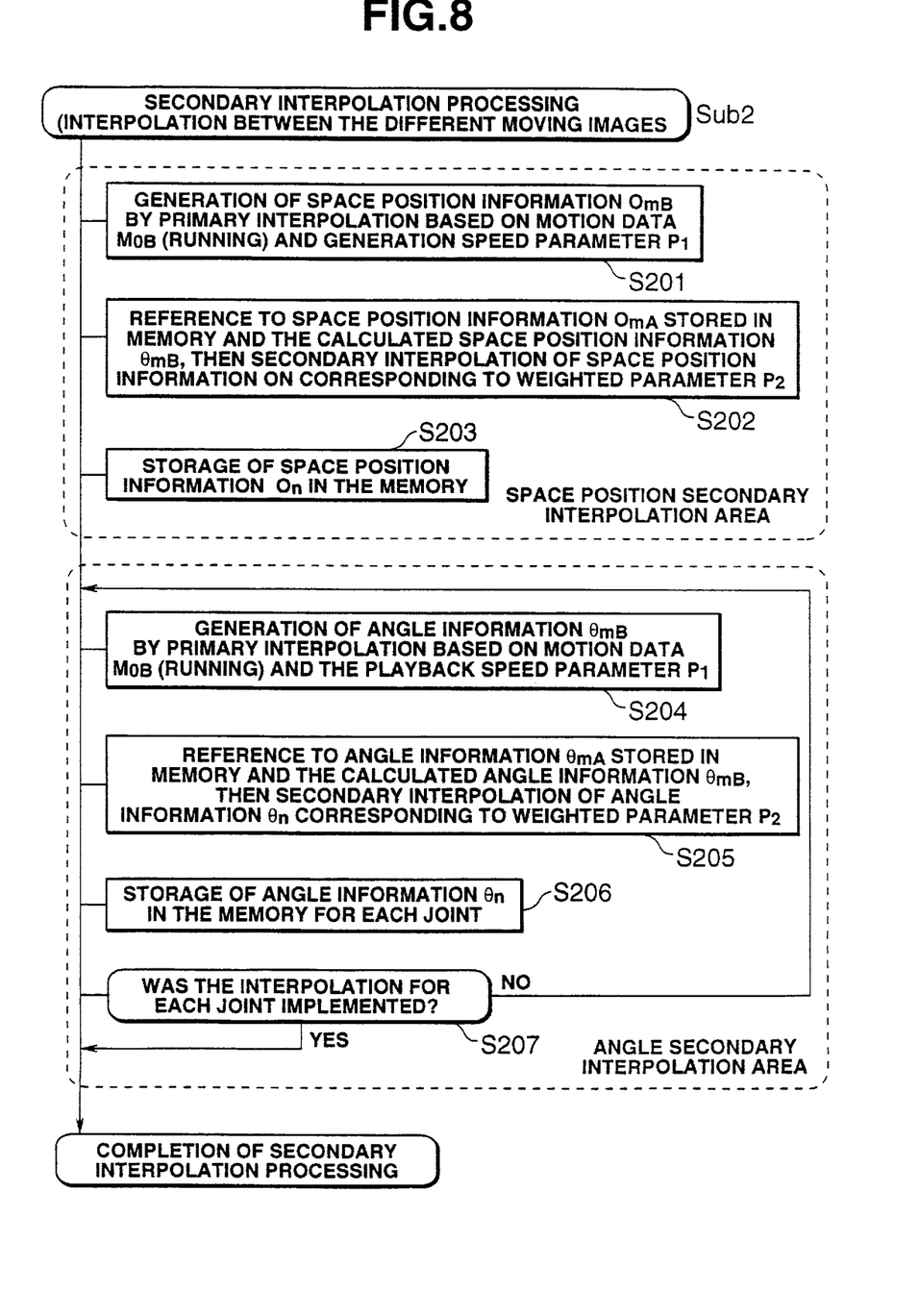
FIG. 8. A flowchart explaining the secondary interpolation processing according to the present embodiment.

In FIG. 8, a flowchart explaining secondary interpolation (weighting interpolation) is shown. Secondary interpolation is implemented by the function block (weighting interpolation circuit 203), wherein CPU 101 implements principally. When secondary interpolation is required (FIG. 3, step S5; YES), secondary interpolation processing is executed in subroutine Sub 2.

In step S201, foremost, primary interpolation is implemented (step S201) with the similar procedures as step S101 of Sub 1, regarding motion data M0B, which is to be the interpolated together with. Space position information OmB generated by primary interpolation, together with space position information OmA stored in memory in step S102 of Sub 1, is secondarily interpolated by weighting parameter P2 (step S203).

Similarly, regarding angle information, angle information θmA is generated with the similar procedure as step S103 of Sub 1 (step S204), and together with angle information stored in memory, is stored in the memory again (step S206). Regarding angle information, whether all of the joints have been interpolated is confirmed (step S207).

Based on space position information and angle information generated by the above interpolation processing, coordinate conversion matrixes of each polygon group are selected and transferred to video block 11. Video block 11 converts the coordinates of polygon data based on these coordinate conversion matrixes, and generates a game image in a viewpoint coordinate style. Accordingly, a character which moves in a new movement mode is displayed on monitor device 5.

The advantages of the above embodiments are as follows.

(a) In the game machine, weighting interpolation is implemented together with time base interpolation, therefore, the athlete may be displayed by naturally changing the movement from one movement to another.

(b) Since the structure is capable of supplying the original data from several types or a CD-ROM, the weighting factor is predetermined for every event in which the user has selected at one's discretion, and a natural movement of the athlete may be displayed for any event.

(c) Since secondary interpolation is implemented after primary interpolation, the generation of an intermediate movement regardless of the playback speed (high/low) may be implemented.

(III) Other Modes

The present invention may be changed variously notwithstanding each of the above modes.

The above modes illustrate an image generation on an assumption of a game machine, but the present invention may also be applied to simulators or computer graphics (CG) which display moving images.

Further, the subject of a moving object may be other animals or vehicles (automobiles, airplanes, etc.) in lieu of an athlete in a track and field event.

Moreover, the weighting parameter of weighting interpolation is illustrated as linearly changing in the above mode, but it may also be changed curvilinearly by utilizing a peculiar calculation formula or a look-up table.

INDUSTRIAL APPLICABILITY

According to the present invention, since interpolation is implemented between the two moving images based on the weighting parameter, a complex yet natural movement of the character model may be displayed with less image data.

Further, according to the present invention, since the required time base interpolation according to the playback speed is implemented for each moving image, regardless of the number of frames of each moving image or the playback speed of the playback, weighting interpolation may be implemented.

In addition, according to the present invention, the weighting parameter may illustrate a natural transfer of movements according to the contents of the moving object or movements if it actively changes the weighting value against the lapse in time.

Moreover, according to the present invention, it may be applicable to the space position and the angle of the joints, etc.

Furthermore, according to the present invention, if the playback speed parameter is changed corresponding to the number of times the operation button is pushed, an interesting operating method capable of adjusting the control of the athlete's movement speed by the number of times the button is pushed may be provided.

What is claimed is:

1. An image generating device for generating a new moving image from moving images of moving objects recorded in a time series for changing postures of said moving objects inside a virtual space, each of said moving objects comprising two different types of moving images, wherein said image generating device displays an intermediate posture of the respective moving object depicted in said two types of moving images by performing:

a primary interpolation, which corresponds to time base adjustment, for assigning to respective frames parameters indicated in ratios of positions on a time base with a primary frame as a reference point and, based on such assigned parameters, generating frame images corresponding to the positions on the time base indicated by a designated playback speed parameter in a number of frames corresponding to said playback speed parameter; and a secondary interpolation, which corresponds to a space position adjustment and is implemented when the primary interpolation generates different frame images displaying a movement mode of a same moving object equivalent to a same position on the time base, for interpolating mutual posture specifying information preset to the respective moving objects with designated interpolation parameters regarding the frame images.

2. An image generating device according to claim 1, comprising:

time base interpolation means for referring to pre-assigned parameters which specifies postures changing per frame image with respect to each of the two types of moving images, specifying two frame images, specifying two frame images possessing said parameters just before and after the playback speed parameter provided externally, interpolating two posture specifying information possessing the two specified frame images, and thereby generating new posture specifying information regarding frame images displaying postures on the time base corresponding to said playback speed parameter; and weighting interpolation means for referring to two types of posture specifying information regarding said frame images generated with said time base interpolation means to be displayed at the same time, weighting and interpolating the two referred posture specifying information based on weighting parameter for indicating a ratio of weighting between said two types of moving images, and generating posture specifying information displaying said new posture.

3. An image generating device according to claim 2, wherein said weighting interpolation means changes said weighting parameter with predetermined characteristics according to lapse in time.

4. An image generating device according to claim 2, wherein said weighting interpolation means linearly interpolates said two posture specifying information based on said weighting parameter.

5. An image generating device according to claim 2, wherein said posture specifying information includes space position information which prescribes space positions of a plurality of parts set in advance in said moving object within said virtual space.

6. An image generating device according to claim 5, wherein if said weighting interpolation means set each of the space positions obtained from the two types of moving image data to (xA, yA) and (xB, yB), respectively, and sets the weighting parameter to n (0≦n≦1), then the space position (X, Y), which is said new posture specifying information, is calculated by the formula of:

$$(X, Y) = ((1-n) \cdot xA + n \cdot xB, (1-n) \cdot yA + n \cdot yB).$$

7. An image generating device according to claim 2, wherein said posture specifying information includes angle information which prescribes a rotating angle around a rotating axis in a plurality of rotating portions set in advance in said moving object.

8. An image generating device according to claim 7, wherein if said weighting interpolation means set each of the angle information obtained from the two types of moving image data to (θxA,θyA) and (θxB, θyB), respectively, and sets the weighting parameter to n (0≦n≦1), then space position (θx, θy), which is said new posture specifying information, is calculated by the formula of:

$$(\theta x, \theta y) = ((1-n) \cdot \theta xA + n \cdot \theta xB, (1-n) \cdot \theta yA + n \cdot \theta yB).$$

9. An image generating device according to claim 2, wherein said two types of moving image data display moving images of said moving objects which resemble one another, and further, each of postures in the starting point of the change in a time series resemble each other, and each of postures in the finishing point of the change in a time series resemble each other.

10. An image generating device according to claim 2, further comprising:

a memory for storing posture specifying information which said weighting interpolation means refers to; and image generating means for generating frame images for displaying a new posture within said virtual space based on posture specifying information interpolated by said weighting interpolation means.

11. An image generating device according to claim 2, comprising:

a memory for storing posture specifying information which said time base interpolation means refers to;

input means for inputting playback speed information by an operator;

parameter generating means for specifying the posture to be generated corresponding to said playback speed information based on the playback speed information and supplied from said input means, and supplying said playback speed parameter for displaying a specified posture to said time base interpolation means.

12. An image generating device according to claim 11, wherein the playback speed information supplied by said input means is pushing information of the operation button provided in said input means, and said parameter generating means adjusts the size of said playback speed parameter based on the number of times said operation button is pushed per time unit based on said pushing information.

13. A game machine comprising an image generating device according to claim 1, wherein said game machine utilizes said posture specifying information for specifying the movements of characters in the game.

14. An image generating method for generating a new moving image from moving images of moving objects recorded in a time series for changing postures of said moving objects inside a virtual space, each of said moving objects comprising two different types of moving images, wherein said image generating method displays an intermediate posture of the respective moving object depicted in said two types of moving images by performing:

a primary interpolation step, which corresponds to time base adjustment, for assigning to respective frames parameters indicated in ratios of positions on a time base with a primary frame as a reference point and, based on such assigned parameters, generating frame images corresponding to the positions on the time base indicated by a designated playback speed parameter in a number of frames corresponding to said playback speed parameter; and a secondary interpolation step, which corresponds to a space position adjustment and is implemented when the primary interpolation step generates different frame images displaying a movement mode of a same moving object equivalent to a same position on the time base, for interpolating mutual posture specifying information preset to the respective moving objects with designated interpolation parameters regarding the frame images.

15. An image generating method according to claim 14, comprising the steps of:

referring to pre-assigned parameters which specifies postures changing per frame image with respect to each of the two types of moving images, specifying two frame images possessing said parameters just before and after the playback speed parameter provided externally, interpolating two posture specifying information possessing the two specified frame images, and thereby generating new posture specifying information regarding frame images displaying postures on the time base corresponding to said playback speed parameter; and referring to two types of posture specifying information regarding said frame images generated by said primary interpolation step to be displayed at the same time, weighting and interpolating the two referred posture specifying information based on the weighting parameter for indicating the ratio of weighting between said two types of moving images, and generating posture specifying information for displaying said new posture.

16. A machine-readable storage medium for storing the program to make a computer perform the steps according to claim 14 or claim 15.

17. A machine-readable storage medium for storing the program to make a computer conduct the steps according to claim 16.

18. An image generating device for generating moving image data from a series of frame images for displaying moving objects, comprising:

a weighting interpolation circuit for referring to posture specifying information which specifies a posture of said moving object in each of frame images included in each of two types of moving image data, weighting and interpolating posture specifying information obtained from each of two types of moving images data based on a predetermined weighting parameter in order to indicate a ratio of weighting between said two types of moving images, and generating posture specifying information for displaying a new posture;

wherein said posture specifying information includes space position information which prescribes space positions of a plurality of parts set in advance in said moving object within a virtual space; and wherein if said weighting interpolation circuit sets each of the space positions obtained from the two types of moving image data to (xA, yA) and (xB, yB), respectively, and sets the weighting parameter to n ($0 \leq n \leq 1$), then the space position (X, Y), which is said new posture specifying information, is calculated by the formula of:

$$(X, Y) = ((1-n) \cdot xA + n \cdot xB, (1-n) \cdot yA + n \cdot yB).$$

19. An image generating device for generating moving image data from a series of frame images for displaying moving objects, comprising:

a weighting interpolation circuit for referring to posture specifying information which specifies a posture of said moving object in each of frame images included in each of two types of moving image data, weighting and interpolating posture specifying information obtained from each of two types of moving images data based on a predetermined weighting parameter in order to indicate a ratio of weighting between said two types of moving images, and generating posture specifying information for displaying a new posture;

wherein said posture specifying information includes angle information which prescribes a rotating angle around a rotating axis in a plurality of rotating portions set in advance in said moving object; and wherein if said weighting interpolation circuit sets each of the angle information obtained from the two types of moving image data to ($\theta xA, \theta yA$) and ($\theta xB, \theta yB$), respectively, and sets the weighting parameter to n ($0 \leq n \leq 1$), then space position ($\theta x, \theta y$), which is said new posture specifying information, is calculated by the formula of:

$$(\theta x, \theta y) = ((1-n) \cdot \theta xA + n \cdot \theta xB, (1-n) \cdot \theta yA + n \cdot \theta yB).$$

* * * * *

UNITED STATES PATENT AND TRADEMARK OFFICE
CERTIFICATE OF CORRECTION

PATENT NO. : 6,203,425 B1
DATED : March 20, 2001
INVENTOR(S) : Shinobu Hayashi

It is certified that error appears in the above-identified patent and that said Letters Patent is hereby corrected as shown below:

<u>Column 15,</u>
Line 28, before "weighting", insert -- a --.

Signed and Sealed this

Third day of September, 2002

Attest:

Attesting Officer

JAMES E. ROGAN
Director of the United States Patent and Trademark Office